July 10, 1923.
E. C. LANE
CUTTER BAR FOR LAWN MOWERS
Filed March 5, 1921
1,461,532
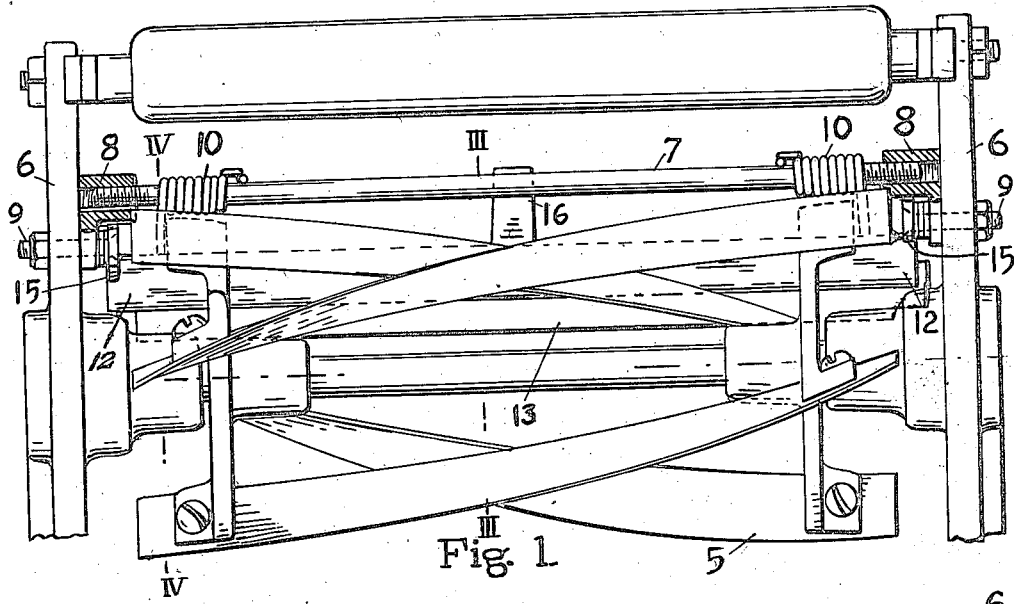
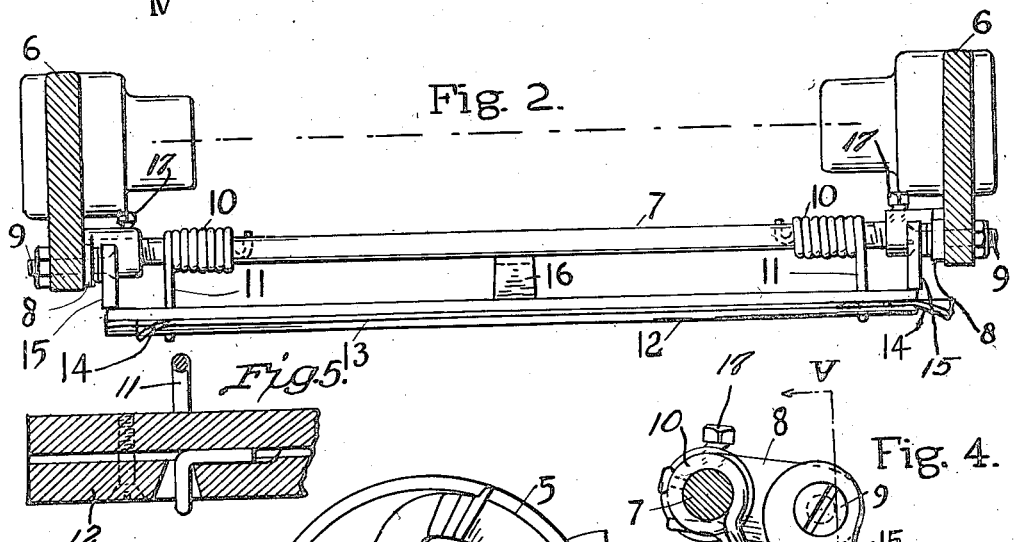
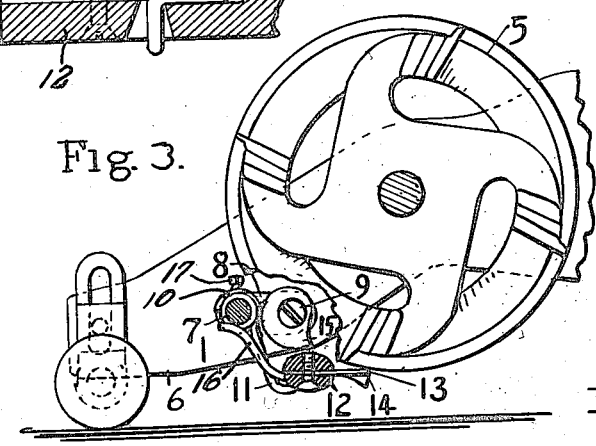
Inventor,
Edwin C. Lane,
By Samuel W. Balch
Attorney.

Patented July 10, 1923.

1,461,532

UNITED STATES PATENT OFFICE.

EDWIN C. LANE, OF MAHWAH, NEW JERSEY.

CUTTER BAR FOR LAWN MOWERS.

Application filed March 5, 1921. Serial No. 449,714.

*To all whom it may concern:*

Be it known that I, EDWIN C. LANE, a citizen of the United States of America, and a resident of Mahwah, in the county of Bergen and State of New Jersey, have invented certain new and useful Improvements in Cutter Bars for Lawn Mowers, of which the following is a specification.

This invention relates to the manner of mounting the lower blade or cutter bar against which the grass is cut by the revolving cutting reel so that it is spring pressed against the reel and will follow any irregularities due to the wear of the reel-blades and preserve a cutting contact.

The object of the invention is to provide a lawn-mower with a cutter blade and mounting therefor which will be self adjusting and which also in any common make of lawn-mower may be readily substituted for the cutter bar originally supplied, whereby after the blades of the cutting reel have become irregularly worn the lawn-mover can be restored to an efficient cutting apparatus.

In the accompanying sheet of drawings which forms a part of this application—

Figure 1 is a plan showing that portion of a lawn-mower which includes the cutting reel and the cutter blade and mounting therefor which embodies this invention.

Fig. 2 is a front view of the same.

Fig. 3 is a cross section on the line III—III of Fig. 1.

Fig. 4 is a cross section to a larger scale on the line IV—IV of Fig. 1.

Fig. 5 is a longitudinal section through one end of the holder on the line V—V of Fig. 4.

A lawn-mower having the usual cutting reel 5 with helically disposed blades between side frames 6, 6 carries a transverse member in the form of a rod 7 the ends of which are threaded into lugs 8, 8 to provide adjustment so that the lugs can be spaced apart to fit between the side frames as the distance is found to vary slightly in different lawn-mowers which are built for the same width of cut. Bolts 9, 9 pass through these lugs and holes in the side frames through which the bolts passed for securing the cutter-bar originally provided. By this means the transverse rod is rigidly supported to the rear and below the axis of the cutting reel and far enough away therefrom to clear the reel. Helical springs 10, 10 are located near each end of the transverse rod and surround the rod and each has one end attached thereto. The other ends of the springs are formed into arms 11, 11 which project substantially radially from the transverse rod. The ends of the arms are attached to a holder 12 formed by clamping with screws two half oval bars. The ends of the arms pass upward through holes in the lower bar and have their ends bent parallel to the bars and confined in grooves in the bars so that the holder can rock slightly with respect to the arms. The holder carries a lower blade 13 which bears against the cutting reel, being held against the reel by the springs acting through the arms. The lower blade is somewhat longer than the cutting reel and has each end turned down diagonally at 14. Each reel blade as illustrated is a left hand helix and the entering ends of the blades are at the left hand side of the drawing in Figs. 1 and 2. The blade is set in the holder so that the entering end of the reel blade will ride onto the turned-down end of this lower blade. If the helix formed by a reel-blade is of the opposite hand then the other end of each reel-blade will enter first and the lower blade will be set in the holder so that the other turned-down end will be under the entering end of each reel-blade. Snails 15, 15 are carried on the bolts which bind the lugs to the side frames, and these serve as adjustable stops to hold the lower blade so that the reel blades will ride onto it properly. The transverse rod is located substantially in the line of a tangent to the reel cylinder at the point of cutting so that the rearward thrust of the reel-blades in cutting will not materially affect the action of the springs in keeping the lower blade in contact with the reel-blades with the proper pressure. In order to keep the lower blade at the proper angle to the cutting reel a rear upward bearing bracket 16 is provided which projects from the rear edge of the holder midway of the ends and bears against the underside of the transverse rod. The lower blade is thereby supported in such a manner that it will follow irregularities in the blades of the cutting reel and be kept in contact for cutting.

Set-screws 17, 17 keep the transverse rod from turning in the lugs so that when these set-screws are set up and the lugs are secured to the side frames the transverse rod becomes a rigid part of the frame suitable for attachment thereto of one end of each of the wires which serve as springs to press the lower blade in contact with the reel.

What I claim, is—

1. In a lawn-mower having a cutting reel, a transverse member rigidly supported between the side frames of the lawn-mower, an arm supported on the transverse member adjacent to each side frame, a lower blade supported at each end from the ends of the arms, and a spring carried by the transverse member for each arm.

2. In a lawn-mower having a cutting reel, a transverse member rigidly supported between the side frames of the lawn-mower, an arm supported on the transverse member adjacent to each side frame, a lower blade supported at each end at a point rearward of the line of the cutting edge from the ends of the arms and having a rear upward bearing bracket which bears against the underside of the transverse member, and a spring carried by the transverse member for each arm.

3. In a lawn-mower having a cutting reel, a transverse member, a wire coiled at one end to form a spring and secured to the transverse member adjacent to each side frame, and a lower blade lifted at each end by the ends of the spring wires by an upward movement of their ends.

4. In a lawn-mower having a cutting reel, a transverse member, a wire coiled at one end to form a spring and secured to the transverse member adjacent to each side frame and having its other end formed into an arm, and a lower blade carried at each end by the ends of the arms.

5. In a lawn-mower having a cutting reel, a transverse member having ends suitable for its rigid support between the side frames of the lawn-mower sufficiently to the rear of the cutting edge to allow clearance for the cutting reel, wires each of which is supported by the transverse member and is coiled at one end to form a spring and has its other end formed into an arm, and a lower-blade carrier supported at each end by one of the arms and pressed upwardly at each end independently of the other end by one of said springs, the upward thrust at the rear of the carrier being taken by a bracket projecting from the rear of the carrier and bearing against the under side of the transverse member.

EDWIN C. LANE.